No. 658,992. Patented Oct. 2, 1900.
F. A. MILLER.
UTENSIL HANDLE.
(Application filed Apr. 17, 1900.)

(No Model.)

Witnesses
J. S. Appleman,
G. L. Bogue

Inventor
Frank A. Miller.
By H. C. Evert
Attorneys

UNITED STATES PATENT OFFICE.

FRANK A. MILLER, OF WASHINGTON, PENNSYLVANIA.

UTENSIL-HANDLE.

SPECIFICATION forming part of Letters Patent No. 658,992, dated October 2, 1900.

Application filed April 17, 1900. Serial No. 13,210. (No model.)

*To all whom it may concern:*

Be it known that I, FRANK A. MILLER, a citizen of the United States of America, residing at Washington, in the county of Washington and State of Pennsylvania, have invented certain new and useful Improvements in Utensil-Handles, of which the following is a specification, reference being had therein to the accompanying drawings.

This invention relates to certain new and useful improvements in utensil-handles, and contemplates the provision of a simple, compact, and strong combination handle and stove-lid lifter and one which, while susceptible of ready application to and removal from utensils and stove-lids, is highly reliable in operation.

Briefly described, the invention consists of a socket-piece adapted to be secured to a skillet or other utensil and a removable handle having one end formed into a stove-lid lifter and the opposite end into a grip, the handle being provided with a catch for engaging the skillet and securing the former in position when desired to lift the skillet or other utensil.

In describing the invention in detail, reference is had to the accompanying drawings, forming a part of this specification, and wherein like numerals of reference indicate corresponding parts throughout both views, in which—

Figure 1:
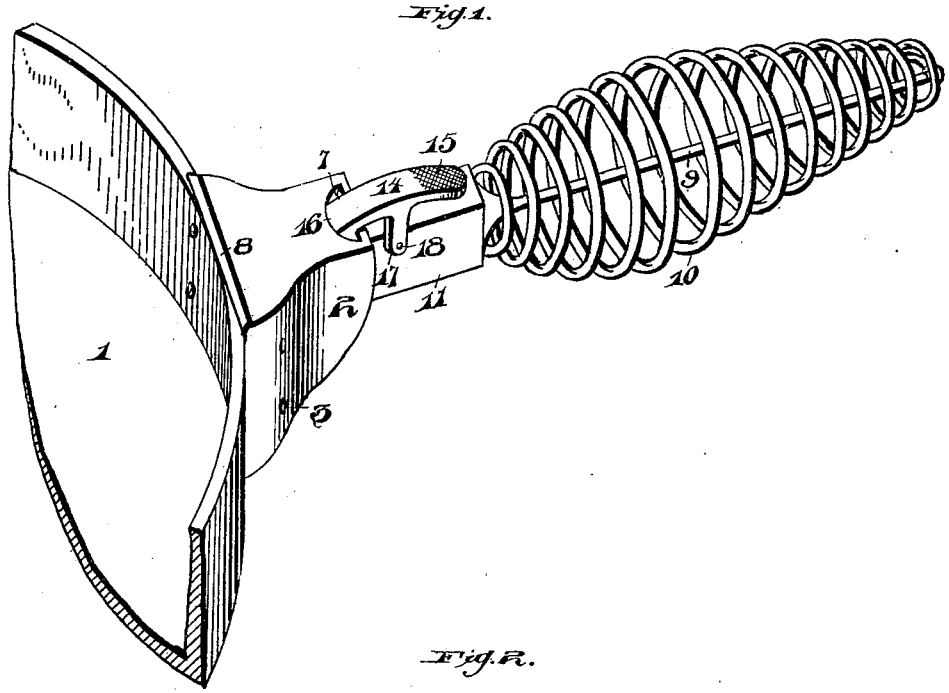
Figure 2:
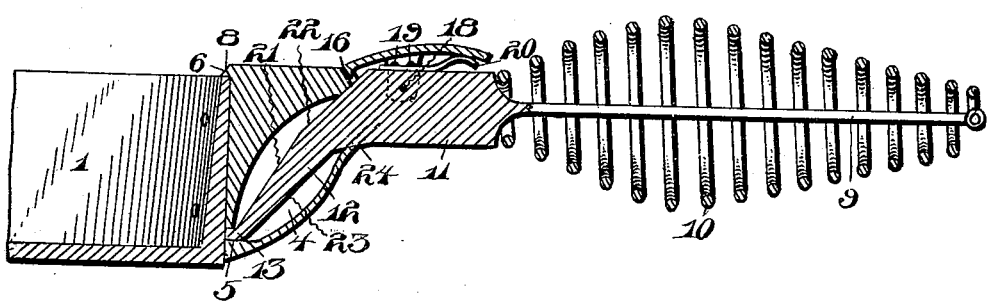

Figure 1 is a perspective view of my improved handle, showing the same connected to a skillet, the latter being broken away. Fig. 2 is a longitudinal sectional view thereof.

Referring to the drawings by reference-numerals, 1 indicates the skillet or other utensil, having a portion of the periphery thereof formed in a straight manner, against which abuts the socket-piece 2, the latter being secured to the skillet or other utensil by means of rivets 3 extending therethrough as well as the side of the skillet or other utensil, as shown. Each side of the socket-piece is formed with a tapering outer flange to enable the same to be secured to the skillet in the manner above stated. The socket-piece is further provided with a recess 4, terminating in the opening 5. The engaging side of the socket-piece with the skillet at the upper corner of the former is provided with an offset or shoulder 6, which engages the top edge of the side of the skillet or other utensil diametrically opposite the shoulder 6. The top of the socket-piece is formed with a segment-shaped recess 7, and the upper corners of the socket-piece are beveled, as shown at 8.

My improved handle is provided at one end with a rod 9, surrounded by a series of wire coils 10, forming a grip for the hand of the operator. The rod 9 terminates into an enlarged portion 11, forming the shank of the handle, which terminates into a downwardly-extending tapering portion 12, forming the stove-lid lifter, and which is provided at its lower end with a toe 13, which is seated within the recess 5. Mounted upon the shank 11 is a securing-catch 14, provided on its upper face at one side thereof with a roughened portion 15 and on its lower face at the opposite side thereof with a hook 16, which engages within the segment-shaped recess 7. The catch 14 has formed therewith a pair of downwardly-extending lugs 17, which are pivotally secured to the shank 11 by means of the pin 18. Secured upon the upper face of the shank 11 by means of the studs or pins 19 is a spring 20, which bears against the lower face of the catch 14 and keeps the hook in engagement with the segment-shaped recess 7.

The tapering portion 12 of the handle, which forms the stove-lid lifter, has the upper face thereof formed in a tapering manner upon two different planes, as at 21 22. The portion 22 engages the top outer end of the upper wall of the recess 4, forming a bearing-point. The lower side of the portion 12, forming the stove-lid lifter, is also formed in a tapering manner upon two different planes, as at 23 24. The portion 24 engages the outer end of the lower wall of the recess 4 and also forms a bearing-point. By this construction when the catch is released from the socket-piece the handle can be drawn outwardly and release the toe from its engagement with the recess 5, and then by lowering the handle slightly the same can be withdrawn from the socket-piece without interruption, overcoming any wedging of the stove-lid lifter within the recess 4.

It is thought the operation of the device when connecting the same to a skillet or other utensil can be readily understood from the foregoing description, taken in connection with the accompanying drawings, as when the same is used as a stove-lid lifter it is applied and manipulated in the manner common to the employment of ordinary lid-lifters.

I of course do not wish to limit myself to the exact construction herein set forth, as various changes may be made in the details of construction without departing from the general spirit of my invention.

Having thus fully described my invention, what I claim as new, and desire to secure by Letters Patent, is—

1. In a device of the character described, the combination with a socket-piece adapted to be suitably secured to a utensil, of a combination handle and stove-lid lifter comprising in its construction a grip portion, a shank arranged at one end of the grip portion, a stove-lid lifter formed integral with said shank portion, a catch carried by said shank portion and adapted to engage said socket-piece for securing the handle and stove-lid lifter thereto, and means carried by said shank and engaging said catch for keeping the same in engagement with said socket-piece.

2. In a device of the character described, the combination with a socket-piece provided with flanged sides and a recess on its upper face and adapted to be suitably secured to a utensil, of a handle provided with a wire grip, a shank portion formed integral with said handle, a stove-lid lifter formed integral with said shank and adapted to be seated within said socket-piece, a catch carried by said shank and adapted to engage in said recess for securing the handle and stove-lid lifter to said socket-piece, and a spring carried by said shank and adapted to engage said catch for keeping the same in engagement in said recess.

In testimony whereof I affix my signature in the presence of two witnesses.

FRANK A. MILLER.

Witnesses:
  JOHN NOLAND,
  N. L. BOGAN.